(12) United States Patent
Doppler

(10) Patent No.: US 12,325,609 B2
(45) Date of Patent: Jun. 10, 2025

(54) WINDING UNIT FOR A CABLE

(71) Applicant: Günther Doppler, Klosterneuburg (AT)

(72) Inventor: Günther Doppler, Klosterneuburg (AT)

( * ) Notice: Subject to any disclaimer, the term of this patent is extended or adjusted under 35 U.S.C. 154(b) by 252 days.

(21) Appl. No.: 18/265,490

(22) PCT Filed: Nov. 12, 2021

(86) PCT No.: PCT/EP2021/081492
§ 371 (c)(1),
(2) Date: Jun. 6, 2023

(87) PCT Pub. No.: WO2022/122301
PCT Pub. Date: Jun. 16, 2022

(65) Prior Publication Data
US 2024/0025697 A1    Jan. 25, 2024

(30) Foreign Application Priority Data
Dec. 7, 2020    (DE) .................... 10 2020 132 471.5

(51) Int. Cl.
*B65H 75/40*    (2006.01)
*B65H 75/44*    (2006.01)

(52) U.S. Cl.
CPC ..... *B65H 75/4402* (2013.01); *B65H 75/4486* (2013.01); *B65H 2301/5115* (2013.01); *B65H 2701/34* (2013.01); *B65H 2801/51* (2013.01)

(58) Field of Classification Search
CPC .. B65H 75/40; B65H 75/425; B65H 75/4402; B65H 75/4449; B65H 75/4486
See application file for complete search history.

(56) References Cited

U.S. PATENT DOCUMENTS

| 4,053,118 A | 10/1977 | Aikins | |
|---|---|---|---|
| 7,503,338 B2* | 3/2009 | Harrington | B65H 75/4484 |
| | | | 137/355.16 |

(Continued)

FOREIGN PATENT DOCUMENTS

| DE | 102009046327 A1 | 5/2011 |
|---|---|---|
| DE | 102011080085 A1 | 1/2013 |

(Continued)

OTHER PUBLICATIONS

International Search Report and Written Opinion mailed Feb. 23, 2022 in related/corresponding International Application No. PCT/EP2021/081492.

*Primary Examiner* — Sang K Kim
(74) *Attorney, Agent, or Firm* — PATENT PORTFOLIO BUILDERS PLLC

(57) ABSTRACT

A winding unit for an electric vehicle charging cable includes a rotationally symmetrical reel unit, a rotationally symmetrical internal body, and a rotationally symmetrical round outlet plate. The winding unit has a first winding region, onto which a cable can be wound, and a second winding region in a radial peripheral region of the reel unit. The second winding region is adjacent to the first winding region so that a cable in the second winding region can be wound from a region close to the first winding region alongside one another in the direction of the round outlet plate opposite to a winding direction in the first winding region. The second winding region extends over a radial portion of the internal body. The round outlet plate is rotatable a predetermined number of revolutions together with the reel unit and in order to then be blocked, so that a cable is pushed out of the outlet opening.

20 Claims, 4 Drawing Sheets

(56) References Cited

U.S. PATENT DOCUMENTS

| | | | |
|---|---|---|---|
| 10,087,040 B2 * | 10/2018 | Morey | B65H 75/4434 |
| 2011/0139521 A1 * | 6/2011 | Ichikawa | B60L 53/18 |
| | | | 903/903 |
| 2014/0117144 A1 * | 5/2014 | Kinomura | H02G 11/02 |
| | | | 242/590 |
| 2017/0129351 A1 * | 5/2017 | Bianco | B65H 75/4486 |
| 2017/0267114 A1 * | 9/2017 | Bianco | B60L 53/18 |
| 2017/0313544 A1 * | 11/2017 | Parke | B65H 57/18 |

FOREIGN PATENT DOCUMENTS

| | | |
|---|---|---|
| EP | 1477448 A1 | 11/2004 |
| WO | 2017189372 A1 | 11/2017 |

* cited by examiner

WINDING UNIT FOR A CABLE

BACKGROUND OF THE INVENTION

Exemplary embodiments of the invention relate to a cable drum and in particular to a winding unit for a cable for charging for an electric vehicle.

The increasing electric mobility makes very specific demands on the required infrastructure. This not only applies to a sufficiently large number of charging stations, which have to be connected to a sufficiently dimensioned energy network, but also to everyday and practical issues, for example the handling of individual charging cables for individual vehicles.

For this, the manufacturers generally deliver charging cables together with the vehicles, which can be accommodated folded more or less loosely in the trunk, in one's own garage, or in other storage spaces of the vehicle. When the charging cable is then brought out for the purpose of charging the vehicle at a public charging point, it is connected to the vehicle with the one side or the plug provided there, respectively, and to the charging station on the other side. A majority of the cable then usually lies on the floor, i.e., on the road, the sidewalk, a parking lot, and ideally on the garage floor. Especially in the case of bad weather, in the case of rain, snow, or slush, the cable gets wet and dirty and then has to be wound by hand in this state after the charging process, which is not only unpleasant, but also hygienically questionable because a large risk for the soiling of one's own clothing or of the hands, respectively, is potentially high. A solution that is actually practicable and suitable for daily use, for such an impractical handling of charging cables is currently not provided by the manufacturers.

There is in fact a large number of cable drums suitable for winding electric cables. For instance, the document DE 10 2009 046 327 A1 describes a device for electrically connecting an electric vehicle to a current tapping point. A cable is thereby also mentioned on a winding device, which is driven via two gear wheels. The one side of the cable is wound in a comparatively wide region in the usual way as in the case of a normal cable drum, while the other end exits from a central region of the cable drum. This results in a number of problems, which relate, in particular, to the current path routing. Due to the fact that the long end of the cable rotates the cable drum during the unwinding or winding, respectively, particular attention has to be paid to the transition to a non-rotating portion, i.e., to the portion of the cable exiting at the central point. Usually one sliding contacts can be considered for this. However, a large number of problems result during the energy transmission by means of sliding contacts due to the electrical power, which is to be transmitted and which is required in order to charge an electric vehicle.

Another solution is described in the document DE 10 2011 080 085 A1. This application also relates to a cable drum, in particular for an electric vehicle, wherein the cable can be wound around a winding core or can be unwound accordingly. Sliding contacts are avoided thereby and the cable can be held in the cable drum in one piece. However, it is also provided according to this document that a portion of the cable exits from the central region of the cable drum. This portion thus cannot be used for an axis and support of the heavy cable drum. In addition, it requires the inner portion and the outer portion of the cable winding to lie one on top of the other, whereby the geometric dimensions of the cable drum become very large and uses a great deal of the available limited storage space in a vehicle.

There is thus a need for a device for winding and stowing charging cables for electric vehicles, which overcomes the known disadvantages of the traditionally used technology, is compact, and furthermore also provides for conditions for further improvements of day-to-day contact.

Exemplary embodiments of the invention are thus directed to a winding device, which is not burdened by the disadvantages of the current charging cables for electric vehicles and which in particular has an easily manageable design, which is suitable for daily use.

SUMMARY OF THE INVENTION

According to one aspect of the present invention, a winding unit is introduced, which is suitable for a cable for charging for an electric vehicle. The winding unit thereby comprises a rotationally symmetrical reel unit, which is rotatably mounted about an axis. In addition, a rotationally symmetrical internal body is present, which is firmly connected to the axis. A rotationally symmetrical round outlet plate is furthermore provided, which is rotatably mounted about the axis. The reel unit thereby comprises a first winding region of a first width, so that a cable can be wound into the first winding region from a region close to the axis one on top of the other. The reel unit also comprises a second winding region in a radial peripheral region of the winding unit, wherein the second winding region is arranged adjacent to the first winding region and comprises a second width, so that a cable in the second winding region can be wound from a region close to the first winding region alongside one another in the direction of the round outlet plate opposite to a winding direction in the first winding region. The second winding region extends over a radial portion of the internal body and can partially surround it.

The round outlet plate may be rotated by a predetermined number of revolutions together with the winding unit and may then be blocked, so that a cable may be pushed out of an outlet opening in a radially peripheral region of the round outlet plate at the height of the second winding region as a result of a continued rotation of the winding unit.

The introduced cable drum comprises a number of technical effects and advantages and improvements: Compared to traditional cable drums, the long portion of the cable on the one side of the winding unit as well as the other, short portion of the cable can be configured individually and is in no way dependent on the length of the other side of the cable. This is attained by means of the specific shape in the interior of the winding unit and the cable routing.

Due to the fact that the rotationally symmetrical round outlet plate can partially rotate freely together with the reel unit, but, on the other hand, can be blocked after a certain number of revolutions of the reel unit, so that both units, in particular the reel unit and the round outlet plate, partially rotate jointly and forcibly partially do not rotate jointly. It can be attained in this way that an end of the cable is pushed out of an opening of the round outlet plate. This is usually the shorter portion of the cable. It is also important to note thereby that the cable does not need to push out of the round outlet plate in a central region, but in a peripheral region thereof.

This can be attained in that the two winding regions, which are provided in the winding unit, are designed differently. The second winding region is located only in a peripheral region of the reel unit adjacent to the round outlet plate. A connection between the first and the second winding region is attained by means of a cable transition piece from the first winding region to the second winding region. The cable transition piece is guided in the interior of the winding unit between the first winding region and the internal body. In addition, the two ends of the cable are wound in the opposite direction in the winding unit.

An operator can now unwind the long end of the cable from the first winding region by means of simply pulling the cable; alternatively, the optionally present motor drive can be used. The round outlet plate thereby rotates together with the winding unit until a predetermined number of revolutions is attained. The round outlet plate is then blocked, in particular with respect to a stationary part, such as, for example, a housing of the winding unit, with respect to which the reel unit continues to rotate, so that the cable is automatically pushed out of the outlet opening of the round outlet plate. The second cable end is thus automatically provided to a user.

Due to the fact that a drive, for example an electric drive, may be located in the interior of the winding unit, the short end is wound in the second winding region in a first winding phase while the round outlet plate does not rotate together with the winding unit, and the long end is also wound in the first winding region.

In a second winding phase, in particular after the short end of the cable has already been wound, the round outlet plate rotates together with the reel unit, wherein the long end of the cable is now wound completely in the first winding region. Both cable ends are thereby optimally and automatically wound by means of the electric drive in the interior of the reel unit.

In addition, all elements of the winding unit can be integrated into a housing, thus resulting in a unit, which is highly compact as a whole and which can be stowed easily in a vehicle or at a different location. The proposed winding unit can thus be operated in a stationary as well as mobile manner.

In addition, it is easily possible to provide a respective cleaning unit for the cable at the outlet opening as well as in the region in which the long cable end enters into the first winding region. It becomes possible in this way that the cable is always wound in a clean state in the winding unit, without a user having to touch or clean the cable by hand. The user only has to pull the plug out of the vehicle as well as out of the charging unit and place it on the floor in each case. The winding can be performed completely autonomously by means of the winding unit, after the winding process has been triggered, for example electrically.

Due to the fact that the round outlet plate can be blocked after a configurable number of revolutions, it can also be ensured that the cable from the winding region 1 is wound almost completely before the cable can be moved out of the winding region 2. The cable can thus only be connected when the complete length is unwound. A thermal overload of the cable is thus ruled out.

The optional motor drive provides the advantage that the cable drum (i.e., the winding unit) does not have to be raised to and held at "waist height", as is practicable for a manual "crank operation". On the contrary, it may perform the winding process automatically with little effort at the outstretched arm.

In addition, a very good protection against damages caused by dirt, in particular water, can be ensured by means of an installation of all electric/electronic components in the static internal body.

Further exemplary embodiments of the winding unit will be described below:

According to an expanded embodiment of the winding unit, a cable with a cable diameter may be present, the cable extending from the first winding region between the latter and the internal body into the second winding region and out of the outlet opening. The cable ends may be provided with plugs. Due to the presence of the cable, the winding unit is assembled for the practical use. Due to the fact that the cable may be inserted into the winding unit or the two winding regions, respectively, through slits provided for this purpose, the winding unit and the cable can be obtained from different sources. In addition, an already available cable may be made more manageable and upgraded by means of the winding unit. It is assumed thereby that the winding unit does not need to be delivered together with the cable. Available charging cables for electric vehicles can thus also be retrofitted with the winding unit.

According to an expanded embodiment of the winding unit, the cable in a wound state can be wound with a first section in the first winding region and with its second section onto the second winding region in the opposite direction. It should be considered that a third short section (i.e., a transition piece) between the first section and the second section of the cable may be located in the interior of the winding unit and more or less experiences its winding reversal here.

According to an advantageous embodiment of the winding unit, the first section may be longer than the second section. For example, the winding unit can stand directly next to the vehicle or the charging socket of the vehicle, respectively, in this way, while the long end of the cable may be connected to the charging station or the charging point at a more remote place.

According to a further embodiment of the winding unit, the first width, in particular of the first winding region, may correspond to the cable diameter plus a tolerance width, which is smaller than the cable width. It may be ensured therewith that the cable may wind into the first winding region layer by layer, without being able to get stuck in the first winding region. The windings of the cable then lie essentially one on top of the other.

According to an alternative embodiment of the winding unit, the first width, in particular of the first winding region, can be wider than the cable diameter. In this case, the cable can also be wound in several cable widths next to one another in the first winding region and can transition into a next winding plane only afterwards. However, the winding unit would advantageously not be more than 2 to 3 cable widths wide, in order to provide for an orderly winding of the cable. The windings of the cable then lie next to one another as well as one on top of the other. In this way, a longer cable section can be wound in the first winding region in spite of compact construction. Slightly more remote charging points, thus, may also become reachable.

According to an expedient embodiment of the winding unit, the second width, in particular of the second winding region, can correspond at least to the cable diameter. A cable length of at least the circumference of the second winding region can thus be wound in the second winding region. Alternatively, 2 to 3 (or more) cable widths can also be provided in the second winding region as winding space, so that the cable length, which is pushed out of the outlet opening of the round outlet plate, can be correspondingly longer.

According to a further advantageous embodiment of the winding unit, the cable may be designed for an electricity-power capacity of at least 11 kW. In addition, a design for a higher charging or electricity-production capacity is possible. In the case of electric cables, different standards for charging electric vehicles can thus be wound by means of the proposed winding unit.

According to an expanded embodiment of the winding unit, the cable diameter may be at least 16 mm or more, in particular 18 mm. In addition, single-phase cables with three conductors or 3-phase cables with, e.g., five conductors, may be used.

According to a further advantageous embodiment of the winding unit, the internal body may have a smaller diameter in a first region than in a second region, over the radial portion of which the second winding region extends. This way, it is made possible that the cable is wound or unwound, respectively, essentially one on top of the other in the first winding region and essentially next to one another in the second winding region.

According to a particularly advantageous embodiment of the winding unit, the reel unit can be rotatably mounted on the first region of the internal body. This portion of the internal body thus becomes a bearing or rotation region, respectively, for the reel unit. The internal body is typically firmly connected to a housing.

For this reason and according to a further exemplary embodiment of the winding unit, the internal body can be hollow and can have a rotational drive unit for the winding unit. The winding unit may be driven without manual effort in this way. For this purpose, an electric motor and a power supply, for example an accumulator or adapter, as well as an electric and/or electronic control unit, can be located in the interior of the internal body.

According to this and according to a further exemplary embodiment of the winding unit, the rotational drive unit may comprise the electric motor, which drives the reel unit with respect to the internal body.

According to a supplemental exemplary embodiment of the winding unit, the motor can advantageously be capable of being switched from outside the internal body. This can take place, for example, by means of a switch on the housing of the winding unit, a key switch, or the like. By means of a key switch, it can also be attained that unauthorized persons do not start up the drive.

According to an additional exemplary embodiment of the winding unit, the motor can additionally be capable of being switched in a remote-controlled manner. This can take place via a radio remote control, via an NFC connection (Near Field Communication), a Bluetooth connection, WLAN, or the like.

According to a further elegant exemplary embodiment of the winding unit, a locking between the round outlet plate and/or the reel unit and/or the internal body can be capable of being triggered electromagnetically from the internal body. The round outlet plate can be fixed in this way with respect to the internal body or the housing, respectively, after the preconfigured number of revolutions, so that only the reel unit can continue to rotate about the internal body, so that the short cable end is pushed out of the second winding region through the outlet opening.

According to a further practical exemplary embodiment of the winding unit, a first cleaning unit can additionally be present in the region of the outlet opening and/or a second cleaning unit in the region of the first winding region. The cable would then in each case run past these cleaning regions or through them, whereby it would be cleaned. A clean cable would thus always be located in the interior of the winding unit.

According to an embodiment of the winding unit, it may furthermore be provided that the cable having mounted plugs on the two ends into the first winding region, Is insertable between the first winding region and the internal body, into the second winding region and out of the outlet opening through respective slits in the winding unit and the round outlet plate. The winding unit and the cable could be obtained from different sources in this way. An already available cable could thus also be connected to the proposed winding unit without one or both plugs having to be disassembled.

A supplemental embodiment of the winding unit can provide that a housing with openings for the two ends of the cable is additionally provided, by means of which at least the reel unit would be surrounded. In addition, the housing could ensure a secure standing of the winding unit on the floor.

It is pointed out that embodiments of the invention have been described with reference to different subject matters of the invention. Some embodiments of the invention can in particular have been described with device claims, and other embodiments of the invention with information relating to the method. When reading this application, however, it will become immediately clear to the person of skill in the art that, unless otherwise specified explicitly, any combination of features, which belong to different types of subject matters of the invention, is also possible in addition to a combination of features, which belong to one type of a subject matter of the invention.

Further advantages and features of the present invention follow from the following exemplary description of currently preferred embodiments. The individual figures of the drawings of this application are to only be considered to be schematic and not to be true to scale.

BRIEF DESCRIPTION OF THE FIGURES

Preferred exemplary embodiments will be described below in an exemplary manner and with reference to the following figures.

DETAILED DESCRIPTION OF EXEMPLARY EMBODIMENTS

Figure 1:
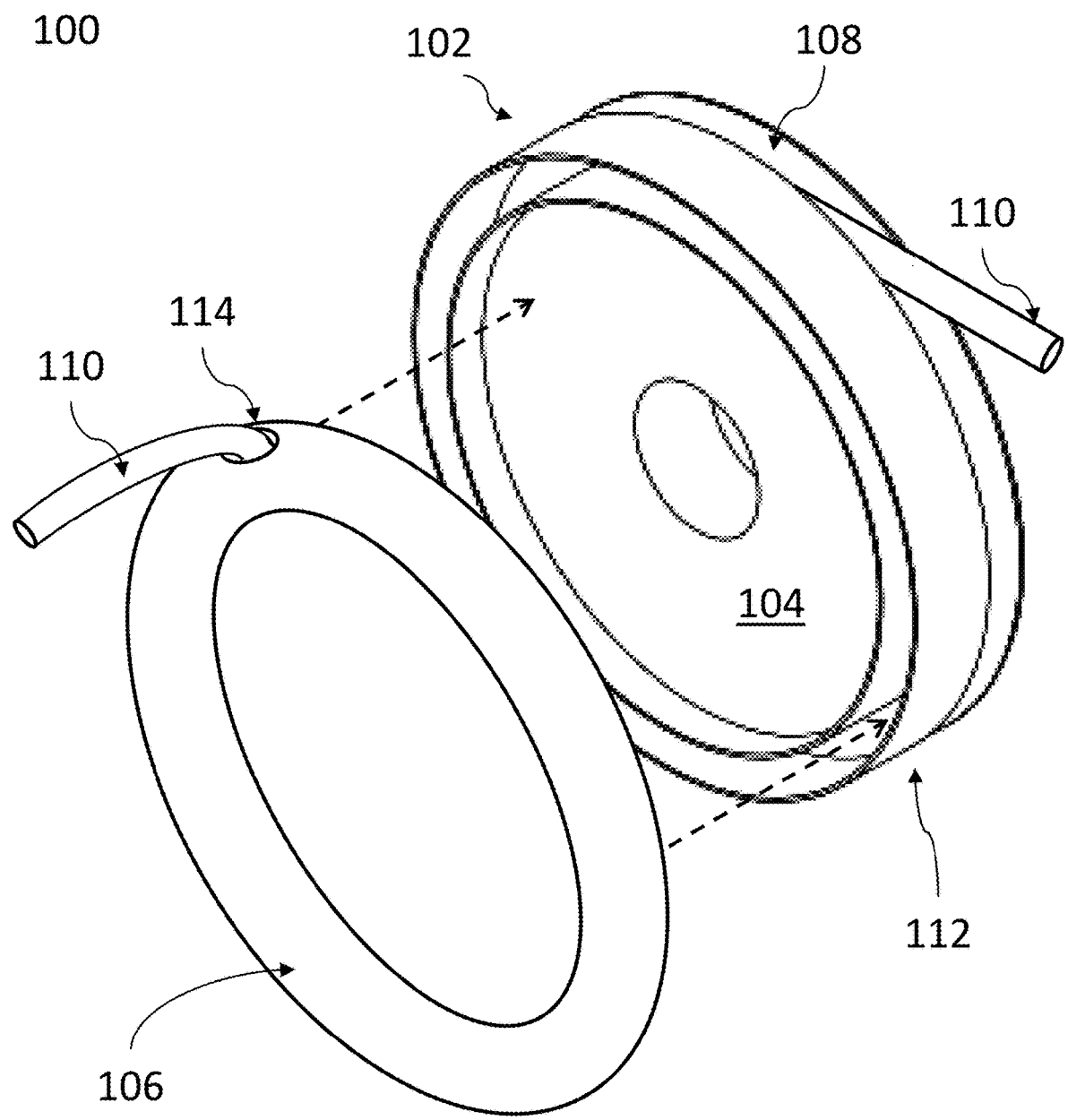
FIG. 1 illustrates an exemplary embodiment of the winding unit according to the invention for a cable for charging for an electric vehicle.

The following terms and expression are used in this document:

The term "electric vehicle" describes every vehicle which is provided with an electric drive. This includes electric cars, electric transporters, electric motorcycles, electric scooters, and also electric trucks as well as electric boats, aircrafts, and electric rail vehicles. Further electrically operated vehicles are not ruled out.

The term "internal body" describes a rotationally symmetrical body, which is located in the interior of the winding unit and which is at least partially surrounded by the reel unit. The portion of the internal body, which has a smaller diameter, can serve as counter bearing for the reel unit. A ball bearing, a double ball bearing, a roller bearing, or a sliding bearing can be present between both. The internal body can be embodied either in a massive or hollow manner.

If it is a hollow internal body, the latter can be closed either on one or on both sides by means of covers. Maintenance operations can be performed easily in this way, e.g., on the electric motor located on the inside. The narrow portion of the internal body can serve as axis of rotation for the winding unit. The internal body can also have a pin in the center of the wider side (e.g.) on the cover, so that it can also serve as axis for the round outlet plate. Other axis drives are conceivable, e.g., starting at a housing of the winding unit.

The term "reel unit" describes an essentially rotationally symmetrical element of the winding unit, which comprises a first winding region and a second winding region. A cable may be guided to the second winding region through an opening, which points in the direction of the internal body, of a side wall of the first winding region.

The term "round outlet plate" describes a ring-shaped element with an outlet opening. The round outlet plate should have a diameter comprising at least the size of the second winding region of the reel unit, plus, e.g., double the cable diameter. The round outlet plate may also be configured as circular disk or may comprise a separable internal portion, which may be received by an axis. In addition, the round outlet plate may be blocked with respect to a rotation of the winding unit. This can take place, on the one hand, by means of a blocking pin (also manually insertable) or alternatively for example electromagnetically from the internal body. An electromagnet can advantageously actuate a locking.

The term "outlet opening" describes an opening in the round outlet plate, through which the cable can be pushed out. The push-out will typically take place essentially in the tangential direction of a surface of the round outlet plate.

The term "cable" describes an electric multi-core cable, which is provided for a power transmission of at least 11 kW or at least 16 A at 240 V. Cables of this type typically have a diameter of almost 2 cm (in particular 1.8 cm). However, the winding unit may also be designed for cables with smaller diameters and also significantly larger diameters.

The term "rotational drive unit" describes an essentially electrically operated unit, such as, for example, an electric motor with a corresponding accumulator, which may supply the motor with electric energy, so that the winding unit can be driven with respect to the internal body and can be set in rotation.

The term "cleaning unit" describes a device in the vicinity of the outlet opening of the round outlet plate, past which or through which the cable can be guided. The cleaning unit consists, for example, of brushes and/or sponges, in order to ensure a cleaning of the cable during the winding. The cleaning unit can be provided either directly on the round outlet plate or a housing, which surrounds the winding unit. A cleaning unit can additionally also be present at the first winding region.

It is pointed out that features or components, respectively, of different embodiments, which are identical or at least functionally identical with the corresponding features or components, respectively, of the embodiment, are provided for the most part with the same reference numerals or with another reference numeral, which differs from the reference numeral of a (functionally) corresponding feature or a (functionally) corresponding component only in its first digit. To avoid unnecessary repetitions, features, or components, respectively, which have already been described on the basis of an above-described embodiment, will no longer be described in detail at a later point.

It is further pointed out that the below-described embodiments only represent a limited selection of possible embodiment variations of the invention. It is in particular possible to combine the features of individual embodiments with one another in a suitable way, so that, for the person of skill in the art, a plurality of different embodiments are to be considered as having been disclosed in an obvious manner with the embodiment variations illustrated explicitly here.

FIG. 1 illustrates an exemplary embodiment of the winding unit 100 according to the invention for a cable for charging for an electric vehicle. The winding unit 100 comprises a rotationally symmetrical reel unit 102, which is rotatably mounted about an axis (not illustrated), a rotationally symmetrical internal body 104, which is firmly connected to the axis, as well as a rotationally symmetrical round outlet plate 106, which is rotatably mounted about the axis.

The reel unit 102 comprises a first winding region 108 of a first width, so that a cable 110 can be wound into the first winding region 108 from a region close to the axis one on top of the other. The winding unit also comprises a second winding region 112 in a radial peripheral region of the reel unit 102 (illustrated schematically without cable), wherein the second winding region 112 is arranged adjacent to the first winding region 108 and comprises a second width, so that the cable 110 in the second winding region 112 can be wound from a region close to the first winding region 108 alongside one another in the direction of the round outlet plate 106 opposite to a winding direction in the first winding region 108. The second winding region 112 extends radially over a portion of the internal body 104.

The round outlet plate 106 rotates by a predetermined number of revolutions together with the winding unit 102 and can then be blocked, so that the cable 110 can be pushed out of an outlet opening 114 in a radially peripheral region of the round outlet plate 106 at the height of the second winding region 112 as a result of a continued rotation of the reel unit 102.

The arrows from the round outlet plate 106 in the direction of the internal body 104 are to only suggest that in the mounted state, the round outlet plate 106 is normally located closely in front of the internal body 104 directly in front of the second winding region 112.

Figure 2:
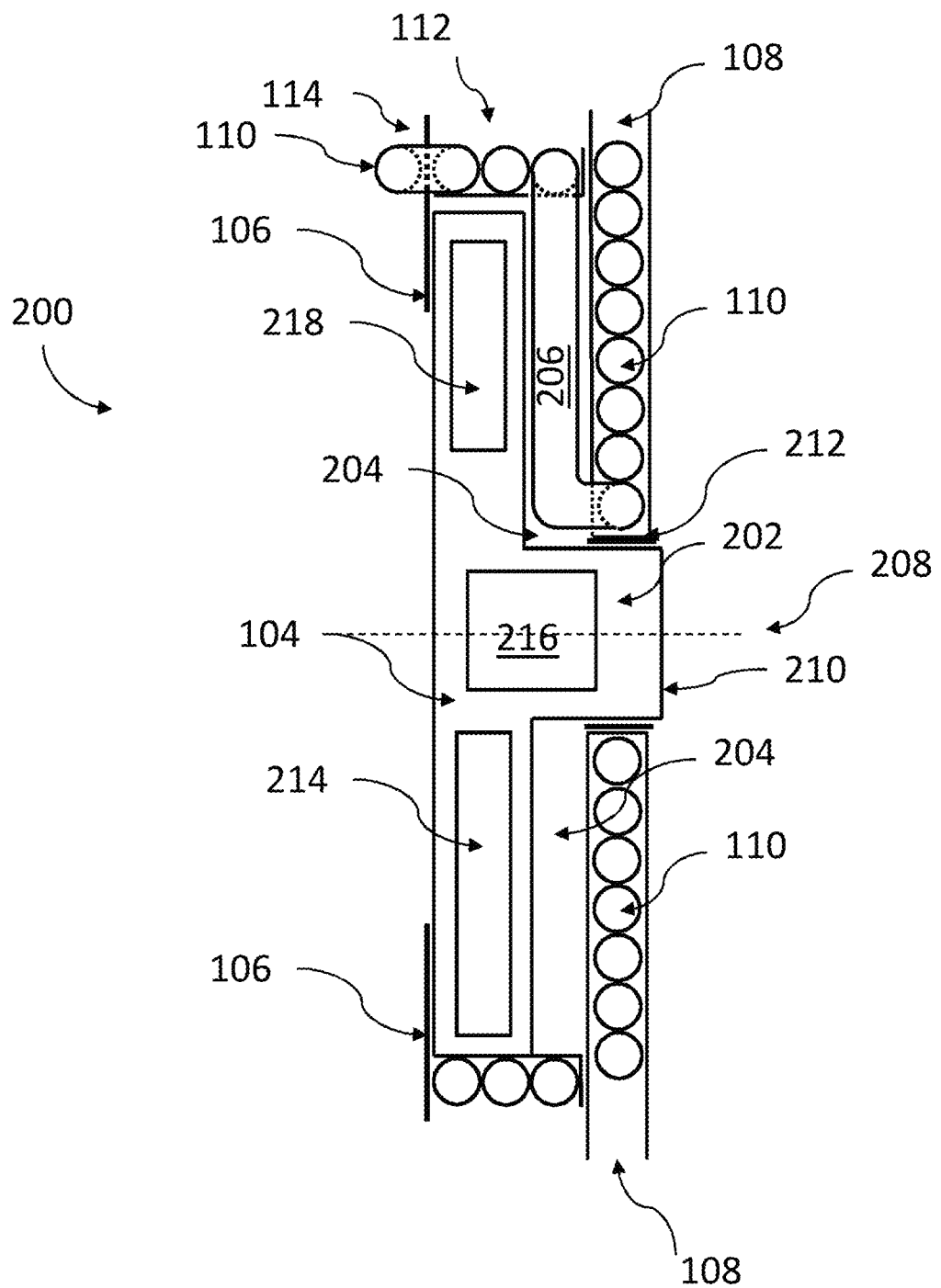
FIG. 2 schematically shows a cross section through a portion of the winding unit.

FIG. 2 schematically shows a cross section 200 through a portion of the winding unit. The first winding region 108 can be seen well, in that the cable 110 is wound one on top of the other in layers. In addition, the internal body 104 and the round outlet plate 106 can be recognized, out of the outlet opening 114 of which the cable 110 can exit. It can also be recognized in this figure that the cable in the second winding region 112 is wound next to one another when several windings are present. The cable leaves the first winding region 108 in a lower region of the winding region 108, thus in the vicinity of the narrower portion 202 of the internal body 104, in order to be guided over a short connecting piece 206 into the second winding region 112 in a hollow space 204 between the first winding region 108 and the internal body 104, in that it is now wound in the opposite direction to the first winding region.

In contrast to FIG. 1, the internal body 104 is now illustrated so as to be closed on the left side. This can be attained by means of a left-side cover for the internal body 104. An electric drive motor 216, an accumulator 214, a remote control receiver, and other control electronics 218 can be accommodated in the interior of the internal body 104. In addition, the electrics or electronics, respectively, in the internal body 104 can be guided out of the internal body 104 via a cable connection in the vicinity of the schematically illustrated axis 208, for example in the region 210 of said internal body 104. This applies to a charging current for the accumulator (not illustrated) as well as to necessary control signals. In addition, a bearing or sliding bearing 212, respectively, is illustrated between the winding unit 102 and the internal body 104.

Figure 3:
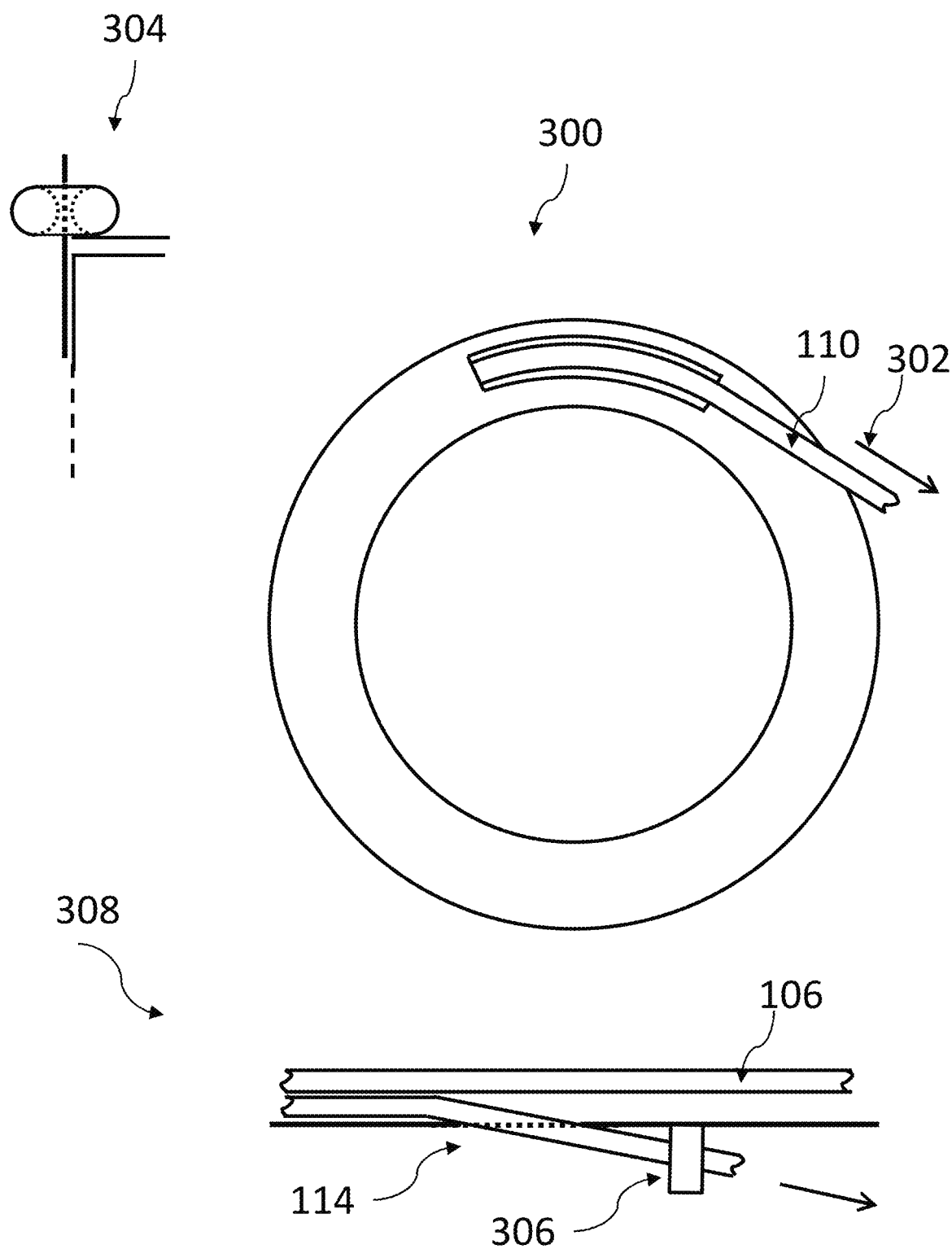
FIG. 3 shows a side view of the round outlet plate, out of which the cable is pushed or also wound, respectively.

FIG. 3 shows a side view 300 of the round outlet plate 106, from which the cable 110 can be pushed out in the arrow direction 302 or can also be retracted again, respectively, in the opposite direction. The partial illustration 304 repeats once again the relevant section for the outlet opening 114 from the round outlet plate 106 of FIG. 2.

The detail illustration 308 shows once again a cross section from the top onto the side view 300. It can be recognized clearly here, how the cable 110 can be pushed out of the outlet opening 114 more or less tangentially over the second winding region. The cleaning unit 306, through which the cable 110 is guided, shall also be mentioned. It can be ensured in this way that a cleaned cable 110 is always located in the interior of the winding unit.

Figure 4:
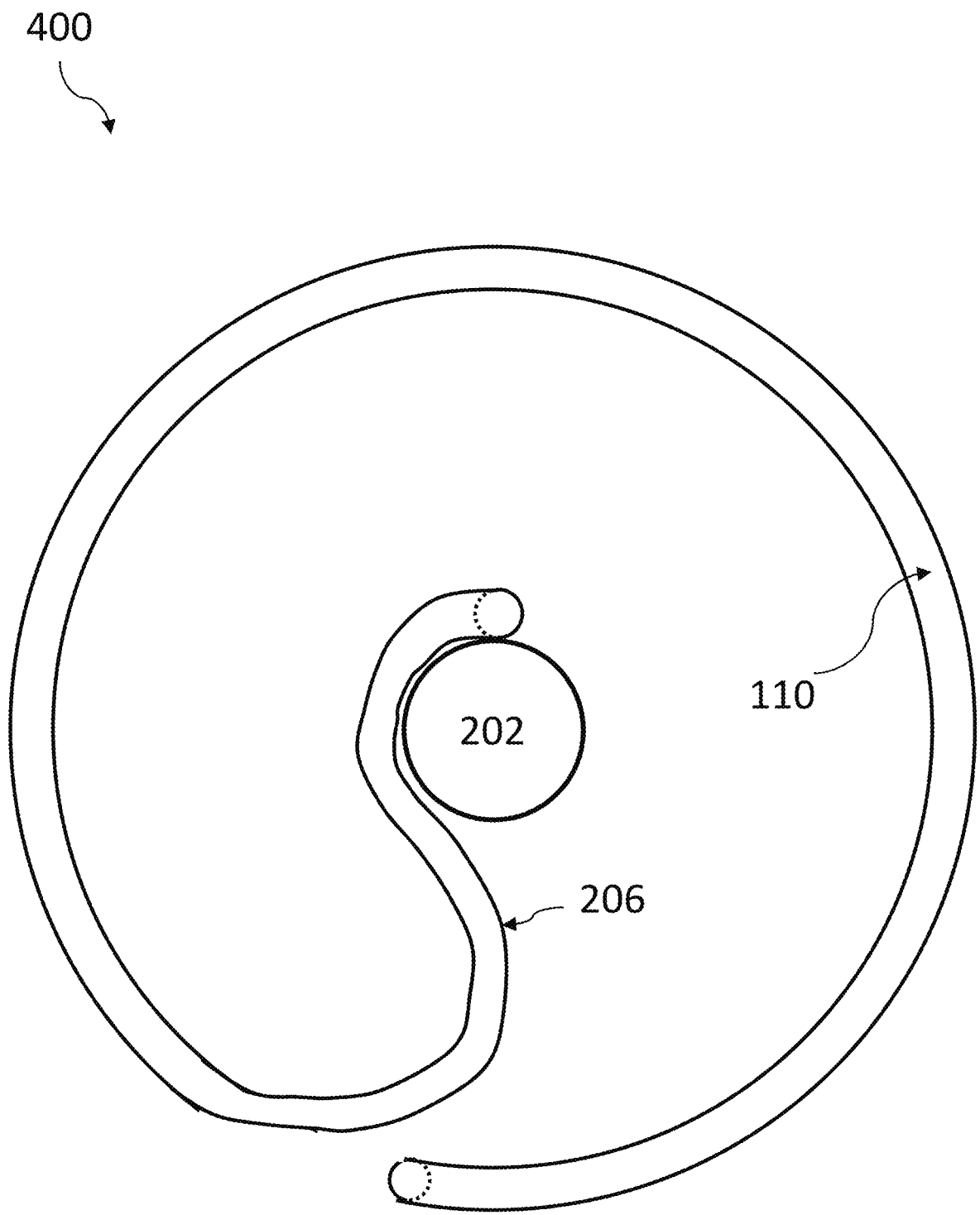
FIG. 4 shows how the cable is guided from the first winding region into the second winding region.

It is illustrated in FIG. 4 (400), how the cable 110 is guided from the first winding region in the vicinity of the narrower portion 202 of the internal body 104 in the region between the first winding region (not illustrated) and the second winding region (not illustrated directly), so that an opposing winding direction results in the first winding region and the second winding region.

The description of the different exemplary embodiments of the present invention was presented for a better understanding but does not serve the purpose of a direct limitation of the inventive idea to these exemplary embodiments. The person of skill in the art develops further modifications and variations on his own. The terminology used here was selected in order to best describe the basic principles of the exemplary embodiments and to make them easily accessible for the person of skill in the art.

The presented structures, materials, processes, and equivalents of all means and/or steps with corresponding functions in the below claims are intended to use all structures, materials, or processes, as it is expressed by means of the claims.

In conclusion: A winding unit for a cable, essentially a cable drum, is introduced, the round outlet plate of which can be partially blocked from rotating together with the winding unit, so that a cable end is pushed out of the outlet opening. The other end of the cable is simultaneously unwound from a first winding region of the winding unit. A respective cleaning unit in the region of outlet openings, for example of a housing of the winding unit, ensures that only cleaned cable is wound in the winding unit. The winding and unwinding can take place in an electrically driven manner.

LIST OF REFERENCE NUMERALS

100 winding unit
102 reel unit
104 internal body
106 round outlet plate
108 first winding region
110 cable
112 second winding region
114 outlet opening
200 cross section through the winding unit
202 narrow region of the internal body
204 hollow space between the first winding region and the internal body
206 section of the cable between first and second winding region
208 symbolic axis
210 region of the internal body
212 bearing or sliding bearing, respectively
214 accumulator
216 motor
218 control electronics
300 side view of the round outlet plate
302 outlet direction of the cable
304 partial illustration of FIG. 2
306 cleaning unit
308 detail illustration
400 illustration of the opposing winding of the cable

The invention claimed is:

1. A winding unit for a cable for charging for an electric vehicle, the winding unit comprising:
   a rotationally symmetrical reel unit rotatably mounted about an axis;
   a rotationally symmetrical internal body firmly connected to the axis; and
   a rotationally symmetrical round outlet plate rotatably mounted about the axis,
   wherein the rotationally symmetrical reel unit comprises a first winding region of a first width, so that a cable is windable into the first winding region from a region close to the axis one on top of the other,
   wherein the rotationally symmetrical reel unit comprises a second winding region in a radial peripheral region of the rotationally symmetrical reel unit, wherein the second winding region is arranged adjacent to the first winding region and comprises a second width, so that a cable in the second winding region is windable from a region close to the first winding region alongside one another in a direction of the rotationally symmetrical round outlet plate opposite to a winding direction in the first winding region, and wherein the second winding region extends over a radial portion of the rotationally symmetrical internal body,
   wherein the rotationally symmetrical round outlet plate is rotatable for a predetermined number of revolutions together with the rotationally symmetrical reel unit and is then blockable, so that a cable is pushed out of an outlet opening in a radially peripheral region of the rotationally symmetrical round outlet plate at the height of the second winding region as a result of a continued rotation of the rotationally symmetrical reel unit.

2. The winding unit of claim 1, wherein the cable has a cable diameter, wherein the cable extends from the first winding region between the first winding region and the rotationally symmetrical internal body into the second winding region and out of the outlet opening.

3. The winding unit of claim 2, wherein, in a wound state, the cable is wound with a first section in the first reel region and with a second section onto the second winding region in an opposite direction.

4. The winding unit of claim 3, wherein the first section is longer than the second section.

5. The winding unit of claim 2, wherein the first width corresponds to a diameter of the cable plus a tolerance width, which is smaller than a width of the cable.

6. The winding unit of claim 2, wherein the first width is wider than a diameter of the cable diameter.

7. The winding unit of claim 2, wherein the second width corresponds at least to a diameter of the cable.

8. The winding unit of claim 2, wherein the cable is configured for an electricity-power of at least 11 kW.

9. The winding unit of claim 2, wherein a diameter of the cable is at least 16 mm.

10. The winding unit of claim 2, further comprising:
a housing with openings for both ends of the cable.

11. The winding unit of claim 1, wherein the rotationally symmetrical internal body comprises a first region with a smaller diameter than in a second region, over the radial portion of which the second winding region extends.

12. The winding unit of claim 11, wherein the rotationally symmetrical reel unit is rotatably mounted on the first region of the rotationally symmetrical internal body.

13. The winding unit of claim 1, wherein the rotationally symmetrical internal body is hollow and comprises a rotational drive unit for the winding unit.

14. The winding unit of claim 13, wherein the rotational drive unit comprises a motor, which is configured to drive the rotationally symmetrical reel unit with respect to the rotationally symmetrical internal body.

15. The winding unit of claim 14, wherein the rotationally symmetrical internal body houses an accumulator for operating the motor.

16. The winding unit of claim 14, wherein the motor is switchable from outside the rotationally symmetrical internal body.

17. The winding unit of claim 14, wherein the motor is switchable in a remote-controlled manner.

18. The winding unit of claim 13, wherein a locking between the rotationally symmetrical round outlet plate and rotationally symmetrical the winding reel or the rotationally symmetrical internal body is triggerable electromagnetically from the rotationally symmetrical internal body.

19. The winding unit of claim 1, further comprising:
a first cleaning unit in a region of the outlet opening or a second cleaning unit in a region of the first winding region.

20. The winding unit of claim 1, wherein the cable has mounted plugs on both ends and is insertable into the first winding region, between the first winding region and the rotationally symmetrical internal body, into the second winding region and out of the outlet opening through respective slits in the rotationally symmetrical winding unit and the rotationally symmetrical round outlet plate.

* * * * *